May 12, 1970  H. HAITE  3,511,482
CONVEYING ROLLER FOR METALLURGICAL FURNACES
Filed May 21, 1968

INVENTOR
Heinz Haite

United States Patent Office 3,511,482
Patented May 12, 1970

3,511,482
CONVEYING ROLLER FOR METALLURGICAL FURNACES
Heinz Haite, Erkrath, Germany, assignor to Pose-Marre Edelstahlwerk G.m.b.H., Erkrath, Germany
Filed May 21, 1968, Ser. No. 730,829
Claims priority, application Germany, June 16, 1967, P 29,513/18
Int. Cl. F27d 3/12
U.S. Cl. 263—6      5 Claims

ABSTRACT OF THE DISCLOSURE

A conveying roller for conveying workpieces through metallurgical annealing or reheating furnaces comprises a body in the form of a cylindrical tube of heat resistant steel and a series of curved pads extending over portions of the peripheral surface of the tube. The pads are made of ceramic-bonded material and are attached to the tube in such a way that thermal movements brought about by the difference in coefficients of expansion of the tube and the pads can take place between the pads and the tube to avoid introducing thermal stresses into the pads.

---

This invention relates to conveying rollers for the hearths of metallurgical annealing or reheating furnaces. The usual form of hearth roller made of heat resistant steel has the disadvantage that granules tend to form on the surface of the roller during the conveying of metal workpieces at high furnace temperatures. What happens is that particles of scale are picked up by the roller from the workpiece, the severity of the effect depending on the furnace temperature, the furnace atmosphere and the load on the roller. The particles of scale tend to build up, by collecting further particles from the workpiece until they form small bumps or granules. When a granule of this kind, still adhering to the surface of the roller, becomes thick enough it can produce a corresponding depression in the workpiece. Finally, the granule becomes detached from the roller and adheres to the surface of the workpiece. These granules, adhering to the surface of the workpiece, can cause serious surface damage during further processing, for example when the workpiece is passing through a straightening machine. The granules are driven into the surface of the workpiece, forming depressions. These depressions are particularly disadvantageous in the manufacture of particular kinds of sheet, which can be rendered useless for certain applications.

Attempts have already been made to prevent, or at least delay, the formation of granules by directly or indirectly cooling the rollers. It is of course possible to do this, but the increased local cooling of the workpiece can easily result in uneven temperature distribution in the workpiece. Furthermore, the cooling is itself expensive in the consumption of power.

Alternatively the rollers can be made of ceramic materials, for example corundum. This material does not form granules, but it is a brittle and fragile material and is not used in practice due to the risk of breakages.

The object of the present invention is to provide a conveying roller for the hearths of annealing or reheating furnaces for metals, which does not form granules and is yet tough enough to be practical. To this end, according to this invention, such a roller comprises a cylindrical support of heat resistant steel and on the peripheral surface of this support a number of pads in the form of part cylindrical sections, made of ceramic-bonded material, the pads being attached to the support in such a way that thermal-movements can take place between them owing to their different coefficients of thermal expansion without introducing thermal stresses.

Three examples of rollers in accordance with the invention are illustrated in the accompanying drawings in which.

All the examples comprise a cylindrical support tube 1, which in its construction, dimensions and material is the same as the usual hollow hearth rollers made of heat resistant steel. Distributed around the outer periphery of the support tube 1 there are curved pads 2, 3, 4, in the form of sections of a hollow cylinder. These curved pads which are made of ceramic bonded material, provide a sufficient area of supporting surface for the workpieces passing through the annealing furnace. The curved pads, 2, 3 and 4 respectively in the three examples, are attached to the support 1 in such a way that the two different parts of the hearth roller, that is to say the support tube and the pads, do not interfere with each other during thermal expansion. This independence of movement during thermal expansion is important because steel has quite a different coefficient of thermal expansion from ceramic-bonded material. The coefficient of thermal expansion of the ceramic-bonded material of the pads is only about half that of steel, or even less. The ceramic-bonded material is, for example, ceramic-bonded metal or metal oxide particles.

Figure 1:
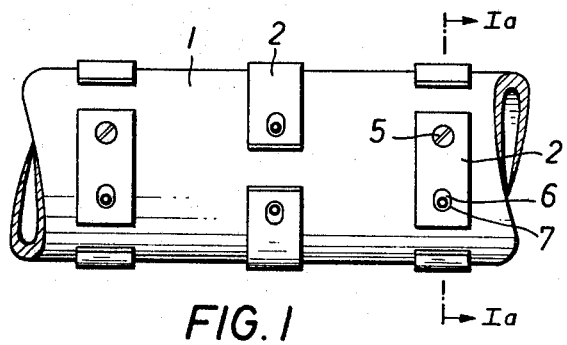
FIG. 1 is a side elevation of the first example and FIG. 1$a$ is a section as seen in the direction of the arrows on the section line I$a$—I$a$ in the side elevation of FIG. 1.
Figure 1A:
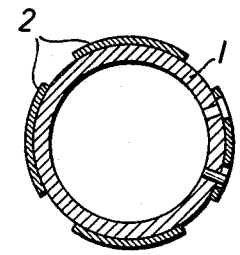

In the example shown in FIGS. 1 and 1$a$ thermal expansion is allowed for in that each curved pad 2 is attached to the support tube 1 at one point only, by means of a countersunk cap screw 5, but is also retained in position by a pin 7 passing through a slot 6 in the curved pad 2. The length of the slot is in the direction of the thermal expansion, that is to say in this case in the circumferential direction.

Figure 2:
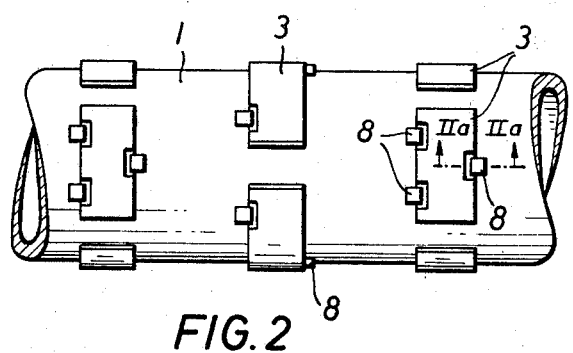
FIG. 2 is a view similar to FIG. 1 of the second example and FIG. 2$a$ is a sectional view of FIG. 2 taken along the line II$a$—II$a$.
Figure 2A:
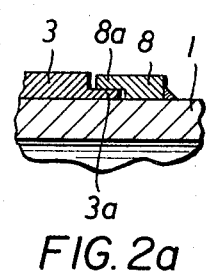

In the example shown in FIGS. 2 and 2$a$ the pads 3 have several recesses in the edges of their outer faces. At these locations the pads are held down on the surface of the support tube 1 by means of straps 8, attached to the support. Each strap 8 is stepped up to project over the edge of the recess in the pad. Each strap 8 is narrower than the stepped down surface of the recess by an amount sufficient to allow for the difference in thermal expansion between the two materials of construction.

Figure 3:
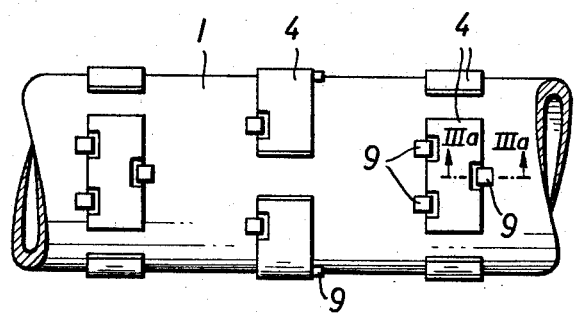
FIG. 3 is also a view similar to FIG. 1 of the third example and FIG. 3$a$ is a sectional view taken along the line III$a$—III$a$.
Figure 3A:
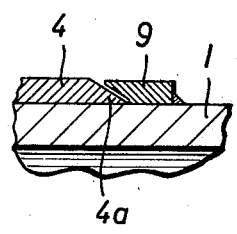

In FIGS. 3 and 3$a$ the pads 4 have bevelled edges in the regions of the attachment points, and the pads 4 are held down on the surface of the support tube 1 by straps 9, which overlap the bevelled edges of the pad. Here again the straps 9 are dimensioned to allow for the difference in thermal expansion between the two materials.

In all cases the outer surface of the attachment means is below the supporting surface of the curved pad.

The curvature of the pads 2, 3 and 4 is chosen so that at normal operating temperatures the internal radius of each pad is the same as the external radius of the support. Under ordinary operating loads each pad therefore rests flush on the surface of the support.

I claim:

1. A conveying roller for the hearth of a metallurgical furnace, said roller including cylindrical support means made of heat resistant steel, a plurality of circularly curved pads made of ceramic-bonded material and means attaching said pads to the periphery of said support, said attaching means being operative to allow thermal movements between said support and said pads owing to difference in the coefficients of thermal expansion of said support and said pads whereby thermal stresses in said pads are avoided.

2. A roller as claimed in claim 1, wherein said attaching means for attaching each of said pads to said support comprises a countersunk cap screw attaching at least one point of said pad to said support, means defining an elongated slot in said pad at a location spaced from said cap screw and a pin extending from said support through said slot.

3. A roller as claimed in claim 1, wherein said attaching means for each of said pads comprises means defining a plurality of recesses in the edges of said pad at its outer face, and a plurality of straps fixed to said support adjacent said pad, each of said straps including a stepped up part which projects over the edge of said pad into one of said recesses.

4. A roller as claimed in claim 1, wherein said attachment means for each of said pads includes a plurality of bevelled edge portions on said pad and a plurality of straps fixed to said support adjacent said pad, each of said straps including a sloping surface which overlaps one of said bevelled edge portions.

5. A roller as claimed in claim 1, wherein each of said pads has an internal radius equal to the external radius of said support at a predetermined operating temperature.

References Cited

UNITED STATES PATENTS

| | | |
|---|---|---|
| 2,950,097 | 8/1960 | Tohir. |
| 3,051,460 | 8/1962 | Furczyk. |

FOREIGN PATENTS

| | | |
|---|---|---|
| 497,846 | 3/1929 | Germany. |

ANDRES H. NIELSEN, Primary Examiner

U.S. Cl. X.R.

193—37